C. F. PFALZGRAF.
BAIL AND BAIL EAR FOR BUCKETS.
APPLICATION FILED FEB. 10, 1914.

1,167,926.

Patented Jan. 11, 1916.

Witnesses
G. J. Baker.
G. Ferd. Vogt.

Inventor
C. F. Pfalzgraf
By Mann & Co.
Attorneys

UNITED STATES PATENT OFFICE.

CHARLES F. PFALZGRAF, OF BALTIMORE, MARYLAND.

BAIL AND BAIL-EAR FOR BUCKETS.

1,167,926.　　　　　　Specification of Letters Patent.　　Patented Jan. 11, 1916.

Application filed February 10, 1914. Serial No. 817,776.

*To all whom it may concern:*

Be it known that I, CHARLES F. PFALZGRAF, a citizen of the United States, residing at Baltimore, in the State of Maryland, have invented certain new and useful Improvements in Bails and Bail-Ears for Buckets, of which the following is a specification.

This invention relates to an improvement in the construction of bails, in their attachment to buckets and kettles, and in their operation at the time the bail is sustaining the weight of the bucket and its contents.

Figure 1:
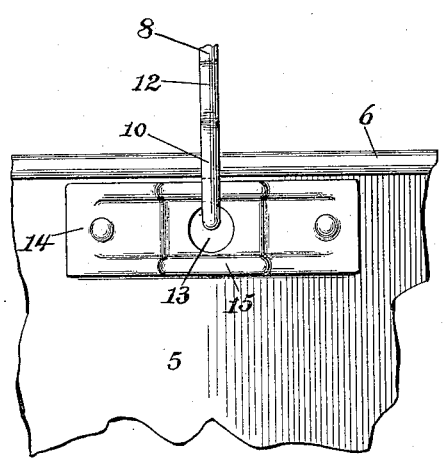
Figure 2:
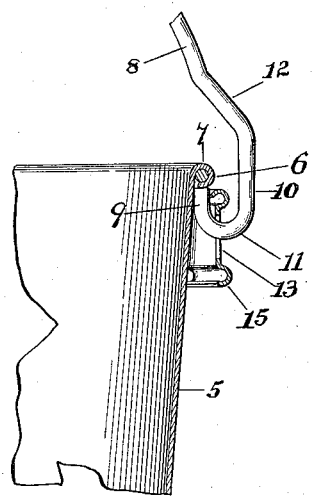
Figure 3:
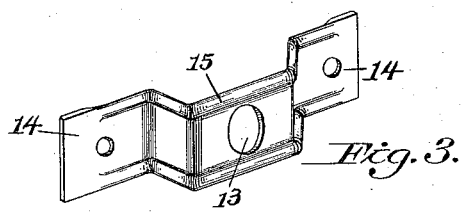
Figure 4:
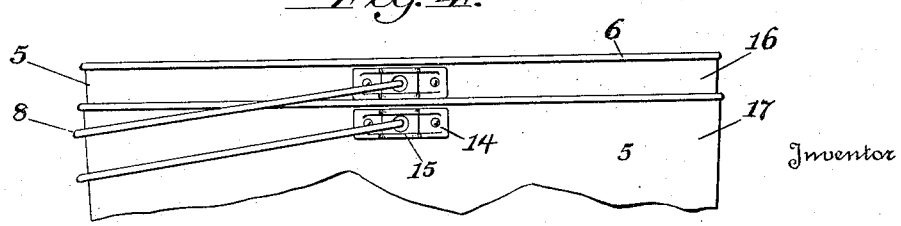

The invention is shown in the accompanying drawing in which, Figure 1 shows a portion of the side wall of a tapered bucket having the improved bail-ear and bail attached. Fig. 2 is a vertical section showing a transverse view of the same parts seen in Fig. 1. Fig. 3 is a perspective view of the bail ear. Fig. 4 is a side view of the top parts of two tapered buckets in "nested" position.

Referring to the drawing, the numeral, 5, designates the wall of a tapered bucket; such buckets as are here shown would be made of sheet-metal. At the top of the wall is a rim, 6, in the form of an outward-turned roll, which is stiffened, as usual, by a wire ring, 7, inclosed within the roll; the top roll thus made is strong enough to permit the application thereto of any means for lifting the bucket and its contents.

One of the features of this invention is the provision whereby the extremity of the ends of the bail-hooks shall point upward and the ends of both hooks of the wire bail shall engage under the said outward-turned roll, 6, of the bucket when the bail is being used to carry the bucket.

The bail part or handle, 8, has the usual arch shape, and at each end is a hook having two vertical sides, 9, and 10, connected by a curved part, 11; the outermost vertical side, 10, of the hook is integrally connected with the base of the arched part, 8, by an inclined portion, 12. The extremity or end of the upturned side, 9, of the hook as will be seen in Fig. 2, contacts with the under surface of the rim roll, 6, on the bucket at the time the arched part, 8, of the bail has the raised or vertical position, and the bail hooks thus contacted will sustain the entire weight of the bucket and contents without causing any strain or pull on the ears.

The only function of the ear relative to the bail is merely to retain the hook-end of the bail in its pivotal position in order that said hook-ends will certainly contact with the rim-rolls. This will be understood by reference to Fig. 2 and Fig. 3, where, it will be seen, the lower curved part, 11, of the bail hook does not at all bear in contact with the hole, 13, in the ear. The upturned side 9, of the hook merely has free position within the cavity of the ear, but does not couple therewith, nor cause strain thereon; the extremity or end only of the upturned side 9, of the hook has bearing, and this bearing and contact of the hook 9, is solely against the outward roll, 6, of the bucket rim. The ear in this device is not the part with which the bail-hook connects; nor does the ear sustain any strain or pull caused by the bail.

The ear has two ends, 14, which are secured to the exterior surface of the bucket wall, 5, and between these two ends is a central outward-bowed part, 15, in which the hole, 13, is made; this part, 15, forms a cavity for the hook end, 9. The diameter of this hole, 13, is much larger than the cross-section diameter of the wire bail at the curved part, 11, of the bail-hook, and as already explained the bail hook does not pivot in the hole of the ear at the time the bail has its raised or vertical position for lifting the bucket; when the bail is turned down to its horizontal position, the hook-end, 9, remains in the ear cavity.

The bail-ear extends horizontally on the bucket wall wholly below the rim roll, 6, and one function of the ear is to serve as an anti-wedge or stop device, which prevents one tapered bucket from becoming tightly wedged when "nested" into another bucket, this is done by the ears on the inner bucket, 16, contacting with the top edge of the rim, 6, on the outer bucket, 17, as seen in Fig. 4. It will be seen that no part of this ear projects above the rolled rim, 6, of the bucket. Also when several buckets are being "nested" the several bails will all turn downward without any part of a bail hindering the placing of the buckets, and the entire bail of the last or topmost inner bucket, will be completely below the top rim, 6.

Having thus described my invention what I claim and desire to secure by Letters Patent is—

1. The combination with a vessel having an outward projection on its wall, of a plate at the side of the vessel wall and having an opening and extending outwardly from said wall to provide a space at the inner side of the plate all around said opening; a swinging bail having an inturned hook that extends through the plate opening which hook is free to swing in said space at the inner side of the plate when the bail is swung up or down,—said hook having a length that will enable it to engage the under side of the vessel-projection when swung up whereby to relieve the wall of the opening in the plate from the weight in the pail.

2. The combination with a vessel having an outward projection, of a plate having its ends secured to the vessel beneath said projection and provided with an outwardly-projecting portion between its secured ends whereby to provide a space between the vessel wall and the outwardly-projecting portion said projecting portion having an opening; a bail having its end bent inwardly toward the vessel wall, said inwardly bent end of the bail extending loosely through the opening in the projecting portion of the said plate and being free at the inner side of said plate said free end of the bail being turned laterally in said space and being movable with the bail, the distance between the bend and free end of the laterally-turned portion thereof being greater than the distance between the wall of the opening in the plate and the projection on the vessel-wall whereby the bail may be turned to swing the bent-end upwardly at the inner side of said plate to engage under the projection on the vessel wall and free the bail from all engagement with the wall of the opening in said plate.

In testimony whereof I affix my signature in presence of two witnesses.

CHARLES F. PFALZGRAF.

Witnesses.
 CHAS. B. MANN,
 G. FERD. VOGT.

Copies of this patent may be obtained for five cents each, by addressing the "Commissioner of Patents, Washington, D. C."